(12) United States Patent
Gautama et al.

(10) Patent No.: US 8,326,259 B2
(45) Date of Patent: Dec. 4, 2012

(54) REMOTE APPLICATION OF VEHICLE COMPONENT SETTINGS

(75) Inventors: Neeraj Roy Gautama, Whitby (CA); Norman J. Weigert, Whitby (CA); Amanda J. Kalhous, AJax (CA); Jarvis Chau, Toronto (CA); Michael J. Chappell, Oshawa (CA)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/027,758

(22) Filed: Feb. 15, 2011

(65) Prior Publication Data

US 2012/0115446 A1    May 10, 2012

Related U.S. Application Data

(60) Provisional application No. 61/410,679, filed on Nov. 5, 2010.

(51) Int. Cl.
*H04M 11/04* (2006.01)
*H04M 3/00* (2006.01)
*G06F 7/00* (2006.01)

(52) U.S. Cl. ............... 455/404.1; 455/420; 701/36
(58) Field of Classification Search ............ 455/414.1, 455/456.1
See application file for complete search history.

(56) References Cited

U.S. PATENT DOCUMENTS

| | | | |
|---|---|---|---|
| 2006/0258377 A1 | 11/2006 | Economos et al. | |
| 2010/0036560 A1* | 2/2010 | Wright et al. | 701/36 |
| 2010/0075655 A1* | 3/2010 | Howarter et al. | 455/420 |

OTHER PUBLICATIONS

German Office Action dated Jul. 20, 2012.

* cited by examiner

*Primary Examiner* — Jean Gelin
*Assistant Examiner* — Michael Mapa
(74) *Attorney, Agent, or Firm* — Cantor Colburn LLP

(57) ABSTRACT

Remote application of vehicle control settings includes detecting a vehicle in proximity of the mobile communication device, authenticating the vehicle via a secured pairing between an identifier of the vehicle and an identifier of the mobile communication device, retrieving driver preference settings assigned to the identifier of the vehicle and the identifier of the mobile communication device, and transmitting the driver preference settings to the vehicle.

14 Claims, 4 Drawing Sheets

REMOTE APPLICATION OF VEHICLE COMPONENT SETTINGS

CROSS-REFERENCES TO RELATED APPLICATIONS

This patent application claims priority to U.S. Provisional Patent Application Ser. No. 61/410,679 filed Nov. 5, 2010 which is hereby incorporated herein by reference in its entirety.

FIELD OF THE INVENTION

The subject invention relates to mobile communications and, more particularly, to remote application of vehicle component settings via a mobile communication device.

BACKGROUND

Mobile communication devices, such as smart phones, are advanced devices that offer much more functionality than the telephony features provided by their predecessors. Currently, these advanced mobile devices provide the ability to run complex applications based on a particular platform. There has been an increasing growth in demand for smart phones due to their advanced computer processing capabilities.

Currently, there is also an increase in the number of automobiles for each household, where oftentimes each driving member of the household operates his/her own vehicle or shares one or more vehicles with others within the household. Each driver is unique in both physical features (e.g., height, weight, etc.) and driving preferences associated with the vehicle (e.g., preferences in music, temperature, etc.). Accordingly, members of households who share the use of a vehicle typically need to manually adjust and readjust vehicle components based upon their physical characteristics (e.g., positions of seats, steering wheel column, mirrors, etc.), as well as their preferences (e.g., thermostat controls, audio tuner settings and volume, etc.) each time they enter the vehicle.

Accordingly, it is desirable to provide a way to automate the execution of driver preferences for a vehicle that leverages the functionality of mobile communication devices.

SUMMARY OF THE INVENTION

In one exemplary embodiment of the present invention, a method for remote application of vehicle control settings is provided. The method includes detecting a vehicle in proximity of the mobile communication device, authenticating the vehicle via a secured pairing between an identifier of the vehicle and an identifier of the mobile communication device, retrieving driver preference settings assigned to the identifier of the vehicle and the identifier of the mobile communication device, and transmitting the driver preference settings to the vehicle.

In another exemplary embodiment of the present invention a system for remote application of vehicle control settings is provided. The system includes a computer processor and logic executable by the computer processor. The logic implements a method. The method includes detecting a vehicle in proximity of the mobile communication device, authenticating the vehicle via a secured pairing between an identifier of the vehicle and an identifier of the mobile communication device, retrieving driver preference settings assigned to the identifier of the vehicle and the identifier of the mobile communication device, and transmitting the driver preference settings to the vehicle.

In yet another exemplary embodiment of the present invention, a computer program product for remote application of vehicle control settings is provided. The computer program product comprises a computer-readable storage medium having instructions embodied thereon, which when executed by the computer processor causes the computer processor to implement a method. The method includes detecting a vehicle in proximity of the mobile communication device, authenticating the vehicle via a secured pairing between an identifier of the vehicle and an identifier of the mobile communication device, retrieving driver preference settings assigned to the identifier of the vehicle and the identifier of the mobile communication device, and transmitting the driver preference settings to the vehicle.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
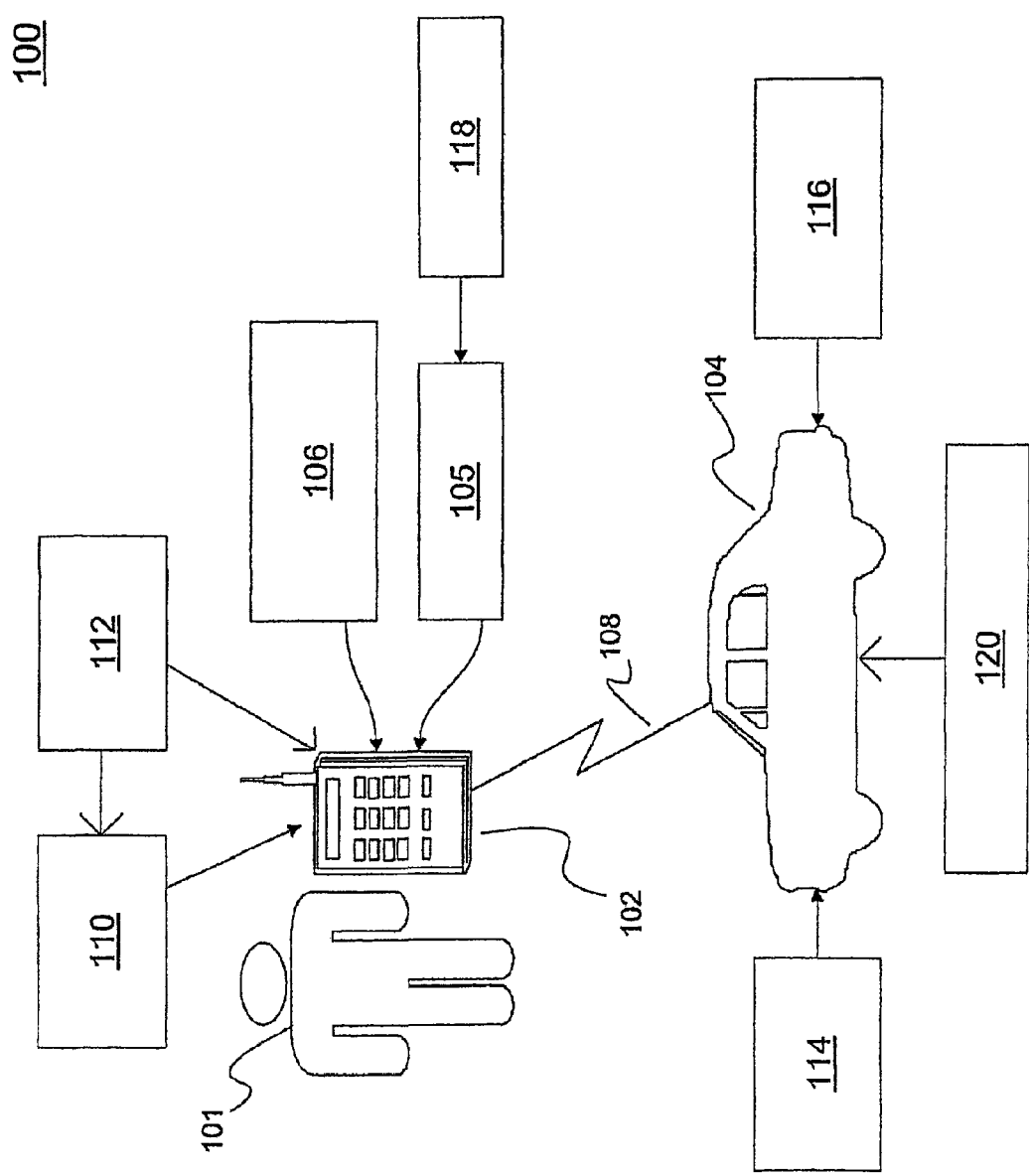
FIG. 1 is a system upon which remote application of vehicle control settings may be implemented in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with an exemplary embodiment of the present invention remote application of vehicle control settings are provided. The exemplary remote application of vehicle control settings automates the execution of driver preferences for a vehicle that leverages the functionality of a mobile communication device. The remote application of vehicle control settings automatically adjusts desired vehicle component settings, such as steering wheel column, pedal positions, and audio system controls, to name a few. Once connected, the full range of vehicle presets is sent from the mobile communication device to the vehicle via a network to set individual driver settings before the vehicle is in operation (e.g., prior to occupancy of the vehicle).

Turning now to FIG. 1, a system 100 upon which the remote application of vehicle control settings may be implemented in accordance with an exemplary embodiment will now be described. The system 100 includes a mobile communications device 102 in communication with a vehicle 104 over a wireless network 108.

The mobile communication device 102 may be a cellular telephone with enhanced functionality (e.g., smart phone). The mobile communication device 102 is operated by a user 101. The mobile communication device 102 includes memory 105 and communication components 106. The memory 105 stores one or more applications typically associated with a mobile communications device (e.g., text messaging application, web browser, contacts/address folder, voicemail, etc.). In an exemplary embodiment, the memory 105 includes profile records 118 created by the user 101 of the mobile communication device 102. A profile record stores vehicle component settings established by the user 101, as described further herein. The communication components 106 enable the mobile communication device 102 to communicate over one or more networks, such as network 108. The mobile communication device 102 is configured with various communication protocols for enabling the communications over communication components 106. For example, the protocols may include Wi-fi, Bluetooth™, and/or cellular communication protocols.

Figure 3:
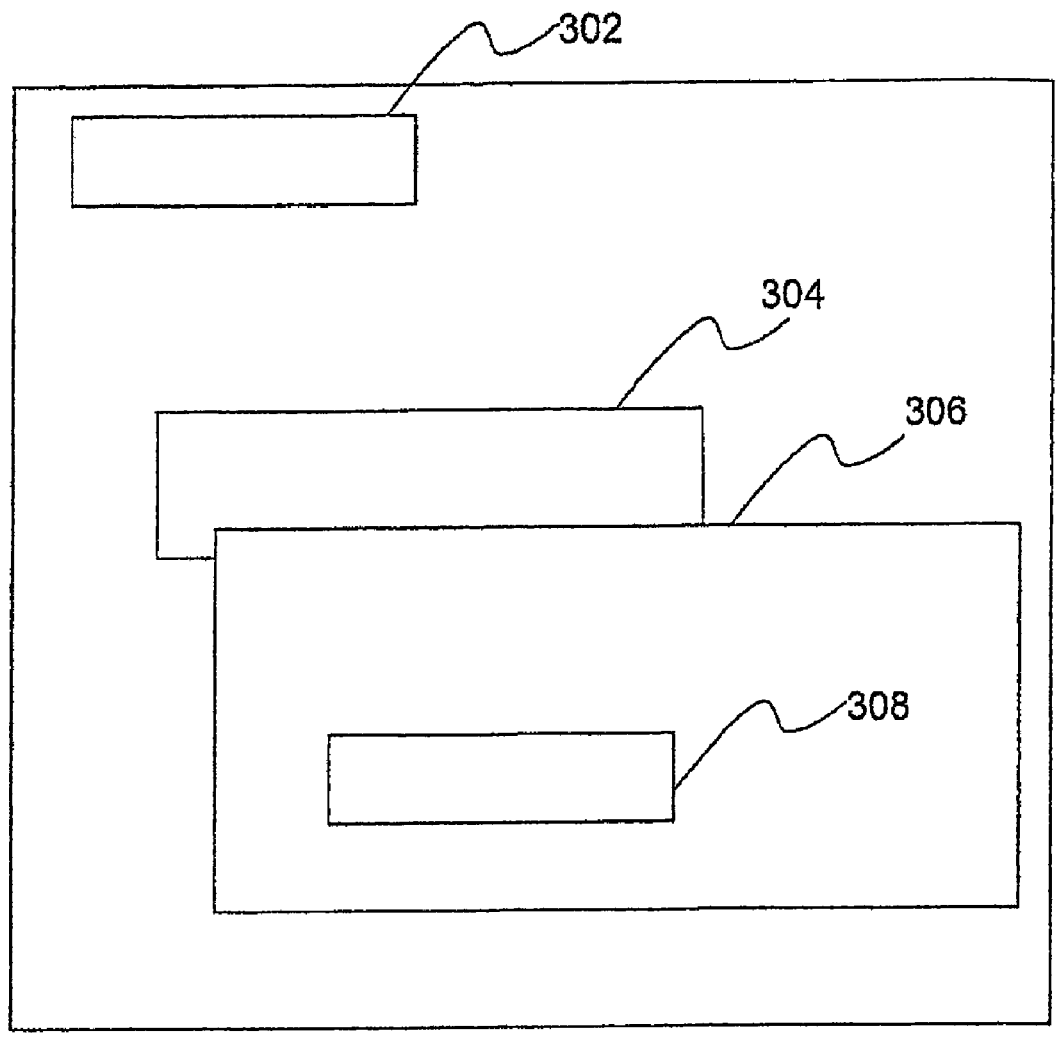
FIG. 3 is a user interface screen of the remote application of vehicle control settings in accordance with an exemplary embodiment.

As indicated above, the mobile communication device 102 implements various applications, such as a web browser, text messaging application, etc. In an exemplary embodiment, the mobile communication device 102 also executes an application or logic 110 for implementing the remote application of vehicle control settings described herein. The logic 110 includes a user interface 112, which may be provided to the user 101 via a display panel of the mobile communication device 102. A sample user interface screen of the user interface 112 is shown in FIG. 3. The logic 110 may also include an encryption algorithm for facilitating a secured pairing between the mobile communication device 102 and the vehicle 104.

The vehicle 104 includes vehicle components 114, a vehicle control system 116, and a local area network 120. At least a portion of these vehicle components 114 are in communication with the vehicle control system 116, e.g., over the local area network 120 of the vehicle 104. The local area network 120 may be a proprietary network configured for the vehicle 104 (e.g., via a vehicle manufacturer).

The vehicle components 114 include settings which may be adjusted by the vehicle control system 116 in response to instructions received from the logic 110, as described herein. The vehicle components 114 may include, for example, seat position (driver and/or passenger), mirror position (side-view and/or rear-view mirrors), steering column, pedal positions, audio system (stations, favorite stations, initial radio station, volume control, equalizer settings), interior lighting, heating, ventilation, and air conditioning (HVAC) controls (temperature settings, dual-zone temperature settings, blower function, A/C on-off, rear-set zone temperature, heated/cooling seats), window positioning (ventilation to full-open), sunroof positioning, driving mode (sport, touring, eco-mode), windshield wipers mode, rear-windshield defrost, DIC (Driver Information Center) information (show speedometer, oil life, fuel remaining, tire pressure), trip vehicle information reset (trip odometer, average fuel consumption, average speed, trip timer), trip metrics for country (e.g., KPH/MPH), Celsius, Fahrenheit), and Heads up Display (HUD) (lighting, information, position).

The vehicle control system 116 may include a computer processor and logic for monitoring, controlling, and adjusting various vehicle controls and components. For example, the vehicle control system 116 may include an engine control module that communicates with vehicle components (e.g., accelerator) and instructs the components to perform respective operations (e.g., increase speed). The vehicle control system 116 may also include an encryption algorithm for facilitating a secured pairing between the mobile communication device 102 and the vehicle 104. The local area network 120 may be a wired or wireless communication network that enables the vehicle components (e.g., vehicle components 114 to communicate with the vehicle control system 116).

The network 108 may be a short-range communication network (e.g., Bluetooth™ or Wi-fi) and/or may be a long-range network (e.g., cellular and/or satellite network).

As indicated above, the exemplary remote application of vehicle control settings automates the execution of driver preferences for a vehicle that leverages the functionality of a mobile communication device. The remote application of vehicle control settings adjusts driver-configured vehicle component settings provided by a user of the remote application of vehicle control settings. Once connected, the full range of vehicle presets is sent from the mobile communication device 102 to the vehicle 104 via the network 108 to set individual driver settings prior to occupancy of the vehicle 104.

Figure 2:
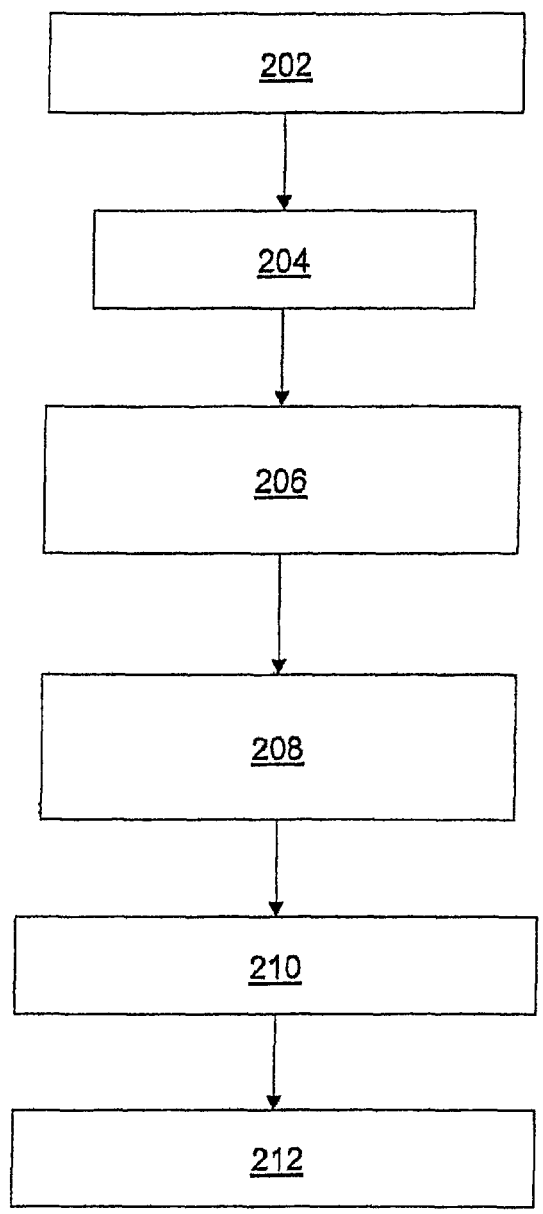
FIG. 2 is a flow diagram describing a process for creating a profile for use by the remote application of vehicle control settings in accordance with an exemplary embodiment.

Turning now to FIG. 2, a flow diagram describing a process for creating a profile for use by the remote application of vehicle control settings in accordance with an exemplary embodiment will now be described. For purposes of illustration, it is assumed that the logic 110 is opened by the user 101 and the user interface 112 is presented on display screen of the mobile communication device 102. A sample user interface screen 300 is shown in FIG. 3. As shown in FIG. 3, the user 101 is prompted to select from various options, such as NEW PROFILE 302 and (e.g., CHANGE EXISTING PROFILE, and VIEW PROFILE). The user 101 selects NEW PROFILE 302 and a window 304 is presented.

When the mobile communication device 102 is in communication range of the vehicle 104, the logic 110 receives an identifier of the vehicle 104 (e.g., the vehicle identification number, or VIN) from the vehicle 104. The mobile communication device 102 connects to the vehicle 104 over the network 108 (e.g., through the vehicle control system 116). At step 204, the logic 110 stores the identifier of the vehicle 102 in the memory 105 with an identifier of the mobile communication device (e.g., electronic serial number (ESN) and personal identifier (PIN)).

The logic 110 prompts the user 101 to place the vehicle key in the ignition of the vehicle and turn it to accessory mode via the window 304 of FIG. 3. The accessory mode is the first key position in a vehicle (e.g., to turn on the radio without running the vehicle).

At step 206, the user 101 is prompted to manually set desired vehicle components 114 via a window 306 in the user interface screen 300. The user selects various settings of the vehicle components 114. For example, the user 101 may adjust the seat position using a vehicle component configured to move the seat up, down, forward, and backward. The user 101 is prompted by the logic 110 to select CALIBRATE 308 from the window 306 when finished selecting the desired settings.

At step 208, the logic 110 queries the vehicle control system 116 for the settings (also referred to herein as 'user' or 'driver' preferences) and receives the settings from the local area network 120 over the network 108 at step 210. At step 212, the logic 110 creates a profile record 118 for the user 101 and stores the settings in the profile record 118 in memory 105.

Once the settings are stored in the profile record 118, the remote application of vehicle control settings may be implemented as will now be described in FIG. 4 in an exemplary embodiment. In one embodiment, the logic 110 may be running in the background of the mobile communication device 104 whereby it continually listens or searches for the vehicle 102. Alternatively, the vehicle 104 may be configured to search or listen for the mobile communication device 102. At step 402, the logic 110 detects the vehicle 104 when the vehicle 104 is in proximity of the mobile communication device 102.

At step 404, the logic 110 authenticates the vehicle 104 via a secured pairing between an identifier of the vehicle 104 and an identifier of the mobile communication device 102. In an exemplary embodiment, the authentication may be implemented by sending a pass code (y) from the logic 110 to the vehicle 104 on the first secure pairing (e.g., when the key is in the ignition of the vehicle 104 and in the accessory mode). The vehicle 104 generates a random number (x) that is combined with the pass code (y) and runs the combined random number (x) and pass code (y) through an encryption algorithm. The resulting identifier (z) is sent over the network 108 to the mobile communication device 102, which combines the identifier (z) with the pass code (y), and runs the combined identifier (z) and pass code (y) through the encryption algorithm to produce an identifier (a). Simultaneously, the vehicle 104 combines the identifier (z) with the pass code (y) and runs it through the encryption algorithm to produce a resulting identifier (b). The resulting identifier (a) from the mobile communication device 102 is sent back over the network 108 to the vehicle 104 which compares the resulting identifier (a) to its resulting identifier (b) and, if the resulting identifiers match, the authentication is successful.

At step 406, the logic 110 retrieves the profile record 118 and driver preference settings assigned to the identifier of the vehicle 104 and the identifier of the mobile communication device 102.

Figure 4:
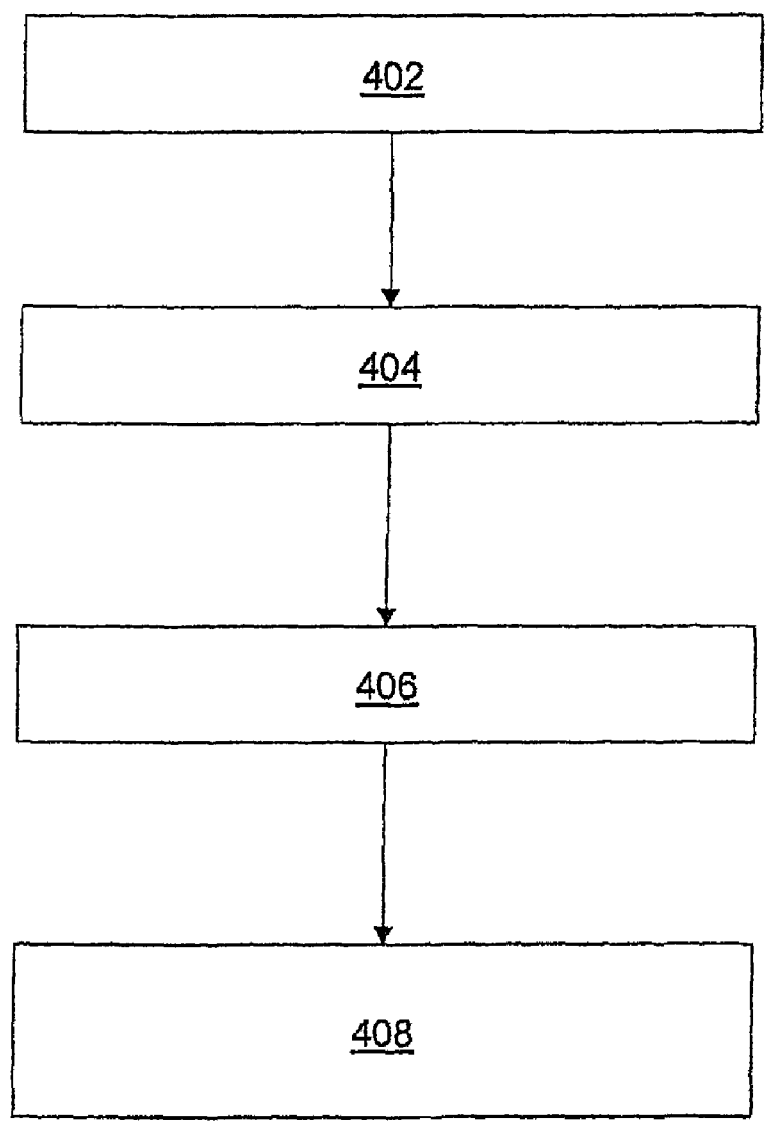
FIG. 4 is a flow diagram describing a process for implementing the remote application of vehicle control settings in accordance with an exemplary embodiment.

At step 408, the logic 110 transmits the driver preference settings to the vehicle 104 over the network 108 prior to occupancy of the vehicle 104 by the user 101 (e.g., as the individual approaches the vehicle 104, the logic 110 is implementing the processes described in FIG. 4). Upon establishing connectivity between the mobile communication device 102 and the vehicle 104, a wake up request is sent by the vehicle 104 over the local area network 120. Confirmation of the successful settings may be sent to the mobile communication device 102 from the vehicle 104.

While only a single profile is described above, it will be understood that the logic 110 may be configured to create and implement multiple profiles for a single individual (e.g., one profile for each vehicle operated by the individual, or two or more profiles for a single vehicle). As indicated above, the logic 110 may be operated in the background of the mobile communication device 102 when it is not connected to, or in communication with, the vehicle 104 in order to minimize the amount of resources utilized.

As described above, the invention may be embodied in the form of computer implemented processes and apparatuses for practicing those processes. Embodiments of the invention may also be embodied in the form of computer program code containing instructions embodied in tangible media, such as floppy diskettes, CD-ROMs, hard drives, or any other computer readable storage medium, wherein, when the computer program code is loaded into and executed by a computer, the computer becomes an apparatus for practicing the invention. An embodiment of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the present application.

What is claimed is:

1. A method for implementing remote application of vehicle control settings, comprising:
   prompting an individual, via a user interface on a mobile communication device, to place a key of a vehicle into an ignition of the vehicle and to turn the key such that the vehicle is in an accessory mode;
   prompting the individual, via the user interface, to manually select driver preference settings by physically manipulating corresponding vehicle components disposed in the vehicle, the vehicle components electronically controlled by a vehicle control system of the vehicle, the driver preference settings identified by the vehicle control system while the vehicle is in the accessory mode;
   responsive to the individual manually selecting the driver preference settings, querying the vehicle control system of the vehicle for the driver preference settings;
   creating a profile record, the profile record storing an identification of the vehicle, an identification of the mobile communication device, and the driver preference settings received from the vehicle control system;
   detecting, via a communications component of the mobile communications device, the vehicle in proximity of the mobile communication device;
   authenticating the vehicle via a secured pairing between the identifier of the vehicle and the identifier of the mobile communication device;
   retrieving the driver preference settings assigned to the identifier of the vehicle and the identifier of the mobile communication device; and
   transmitting the driver preference settings to the vehicle.

2. The method of claim 1, wherein the identifier of the vehicle is a vehicle identification number (VIN).

3. The method of claim 1, wherein the vehicle components include at least one of a(n):
   seat;
   steering wheel column;
   audio system;
   heating, ventilation, and air conditioning system;
   windshield wiper;
   pedal;
   mirror;
   lighting control; and
   window.

4. The method of claim 1, wherein the driver preference settings include at least one of a position and adjustment of the vehicle components.

5. The method of claim 1, wherein transmitting the driver preference settings to the vehicle includes transmitting the driver preference settings to the vehicle over a wireless communication network prior to occupancy of the vehicle by an individual.

6. A mobile communication device for implementing remote application of vehicle control settings, comprising:
   a computer processor; and
   logic executable by the computer processor, the logic implementing a method, comprising:
   prompting an individual, via a user interface on the mobile communication device, to lace a key of a vehicle into an ignition of the vehicle and to turn the key such that the vehicle is in an accessory mode;
   prompting the individual, via the user interface, to manually select driver preference settings by physically manipulating corresponding vehicle components disposed in the vehicle, the vehicle components electronically controlled by a vehicle control system of the vehicle, the driver preference settings identified by the vehicle control system while the vehicle is in the accessory mode;
   responsive to the individual manually selecting the driver preference settings, querying the vehicle control system of the vehicle for the driver preference settings;
   creating a profile record, the profile record storing an identification of the vehicle, an identification of the mobile communication device, and the driver preference settings received from the vehicle control system;
   detecting, via a communications component of the mobile communications device, the vehicle in proximity of the mobile communication device;
   authenticating the vehicle via a secured pairing between the identifier of the vehicle and the identifier of the mobile communication device;
   retrieving the driver preference settings assigned to the identifier of the vehicle and the identifier of the mobile communication device; and
   transmitting the driver preference settings to the vehicle.

7. The system of claim 5, wherein the identifier of the vehicle is a vehicle identification number (VIN).

8. The system of claim 6, wherein the vehicle components include at least one of a(n):
   seat;
   steering wheel column;
   audio system;
   heating, ventilation, and air conditioning system;
   windshield wiper;
   pedal;
   mirror;
   lighting control; and
   window.

9. The system of claim 6, wherein the driver preference settings include at least one of a position and adjustment of the vehicle components.

10. The system of claim 6, wherein transmitting the driver preference settings to the vehicle includes transmitting the driver preference settings to the vehicle over a wireless communication network prior to occupancy of the vehicle by an individual.

11. A computer program product implementing remote application of vehicle control settings, the computer program product comprising a non-transitory computer-readable storage medium having instructions embodied thereon, which when executed cause a computer to implement a method, the method comprising:
   prompting an individual, via a user interface on a mobile communication device, to place a key of a vehicle into an ignition of the vehicle and to turn the key such that the vehicle is in an accessory mode;
   prompting the individual, via the user interface, to manually select driver preference settings by physically manipulating corresponding vehicle components disposed in the vehicle, the vehicle components electronically controlled by a vehicle control system of the vehicle, the driver preference settings identified by the vehicle control system while the vehicle is in the accessory mode;
   responsive to the individual manually selecting the driver preference settings, querying the vehicle control system of the vehicle for the driver preference settings;
   creating a profile record, the profile record storing an identification of the vehicle, an identification of the mobile communication device, and the driver preference settings received from the vehicle control system;
   detecting the vehicle in proximity of the mobile communication device;
   authenticating the vehicle via a secured pairing between the identifier of the vehicle and the identifier of the mobile communication device;
   retrieving the driver preference settings assigned to the identifier of the vehicle and the identifier of the mobile communication device; and
   transmitting the driver preference settings to the vehicle.

12. The computer program product of claim 11, wherein the identifier of the vehicle is a vehicle identification number (VIN).

13. The computer program product of claim 11, wherein the vehicle components include at least one of a(n):
   seat;
   steering wheel column;
   audio system;
   heating, ventilation, and air conditioning system;
   windshield wiper;
   pedal;
   mirror;
   lighting control; and
   window.

14. The computer program product of claim 11, wherein the driver preference settings include at least one of a position and adjustment of the vehicle components.

* * * * *